(12) United States Patent
Kuroda (10) Patent No.: US 9,840,612 B2
(45) Date of Patent: Dec. 12, 2017

(54) SEMICONDUCTIVE ROLLER

(71) Applicant: SUMITOMO RUBBER INDUSTRIES, LTD., Kobe-shi, Hyogo (JP)

(72) Inventor: Kenichi Kuroda, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 309 days.

(21) Appl. No.: 14/609,959

(22) Filed: Jan. 30, 2015

(65) Prior Publication Data

US 2015/0234313 A1 Aug. 20, 2015

(30) Foreign Application Priority Data

Feb. 14, 2014 (JP) .................................. 2014-026901

(51) Int. Cl.
*C08L 11/00* (2006.01)
*C08L 9/00* (2006.01)
*G03G 15/08* (2006.01)

(52) U.S. Cl.
CPC ................. *C08L 11/00* (2013.01); *C08L 9/00* (2013.01); *G03G 15/0818* (2013.01)

(58) Field of Classification Search
None
See application file for complete search history.

(56) References Cited

U.S. PATENT DOCUMENTS

| | | | |
|---|---|---|---|
| 2002/0142134 A1* | 10/2002 | Masuda | G03G 15/0233 428/141 |
| 2006/0269327 A1 | 11/2006 | Mizumoto | |
| 2007/0041752 A1 | 2/2007 | Mizumoto et al. | |
| 2010/0172675 A1 | 7/2010 | Mizumoto et al. | |
| 2011/0130259 A1 | 6/2011 | Ito et al. | |
| 2012/0202663 A1 | 8/2012 | Mizumoto et al. | |
| 2014/0087932 A1 | 3/2014 | Ito et al. | |

FOREIGN PATENT DOCUMENTS

| | | |
|---|---|---|
| JP | 9-114189 A | 5/1997 |
| JP | 10-17718 A | 1/1998 |
| JP | 2002-278320 A | 9/2002 |
| JP | 2007-72445 A | 3/2007 |
| JP | 2008-58608 A | 3/2008 |
| JP | 4688936 B2 | 5/2011 |
| JP | 2011-116481 A | 6/2011 |
| JP | 2012-163776 A | 8/2012 |
| JP | 2013-129747 A | 7/2013 |
| JP | 2013-139490 A | 7/2013 |
| JP | 5236757 B2 | 7/2013 |

* cited by examiner

*Primary Examiner* — Sheeba Ahmed
(74) *Attorney, Agent, or Firm* — Birch, Stewart, Kolasch & Birch, LLP (57) ABSTRACT

A semiconductive roller according to the present invention includes a crosslinked product containing just the three types of rubber of butadiene rubber, epichlorohydrin rubber, and chloroprene rubber as rubber components, has a non-porous, single-layer structure, and has a compression set Cs (%) of not more than 10% as measured in accordance with the measurement method described in the Japanese Industrial Standards JIS K6262:2006 under conditions of a test temperature of 70° C., a test time of 24 hours, and a compression ratio of 25%.

7 Claims, 1 Drawing Sheet

SEMICONDUCTIVE ROLLER

CROSS-REFERENCE TO RELATED APPLICATIONS

The present application corresponds to Japanese Patent Application No. 2014-026901 filed on Feb. 14, 2014 in the Japan Patent Office, and the entire disclosure of this application is incorporated hereon by reference.

FIELD OF THE INVENTION

The present invention relates to a semiconductive roller.

BACKGROUND ART

In any of various image forming apparatuses using an electrophotographic method, such as a laser printer, electrostatic copier, plain-paper facsimile apparatus, or a multifunction printer combining the above, a developing roller is used. The developing roller develops an electrostatic latent image, formed on a surface of a photoreceptor, into a toner image by means of a toner.

As the developing roller, it is effective to use a semiconductive roller, with which the roller resistance value is adjusted to not more than $10^8 \Omega$. This is because the toner can thereby be imparted with a high charging property in correspondence to trends toward fine, uniform, and spherical toners and transition to polymerized toners and the electrostatic latent image can be developed efficiently into the toner image without causing attachment of toner.

In order to answer the various needs regarding the semiconductive roller, various types of rubber component that forms the semiconductive roller, types and blending proportion of additives, structures, etc., are being examined.

For example, to manufacture a semiconductive roller at as high a productivity and as low a cost as possible and improve its durability, compression set, etc., the semiconductive roller is preferably formed to have a non-porous single layer structure. If this structure is to be adopted, it is preferable to use an ion conductive rubber, such as epichlorohydrin rubber, etc., as the rubber component so suppress decrease of the toner charge amount and thereby obtain an image of high an image quality as possible.

For example, in Patent Document 1 (Japanese Patent Publication No. 4688936), the two types of rubber components of epichlorohydrin rubber and chloroprene rubber (CR) are used in combination to form a semiconductive roller. However, when the semiconductive roller that uses just these two types of rubber components in combination is used as the developing roller, decrease of the image density of the formed image occurs due to attachment of toner.

In Patent Document 2 (Japanese Patent Application Publication No. 2007-72445), it is proposed that a semiconductive roller contain a filler (titanium oxide, etc.) having a function of preventing the attachment of toner to suppress the decrease of the image density due to attachment of toner and thereby secure an appropriate image density. However, when the filler is blended at an amount at which the abovementioned function is obtained sufficiently, the hardness of the semiconductive roller increases to cause a new, different problem. That is, degradation of toner occurs readily to cause decrease of image durability, and the nip width when the semiconductive roller is press-contacted with a surface of a photoreceptor becomes narrow and the image quality of the formed image may thereby be degraded. The image durability is an index expressing how long the image quality of the formed image can be maintained satisfactorily when the same toner is repeatedly used to perform image forming.

In one time of image forming, just a portion of the toner housed in a developing portion of an image forming apparatus is used and the remaining large portion of toner is repeatedly circulated inside the developing portion. Therefore a major key to improving the image durability is how much damage is applied or not applied to the toner by the developing roller that is disposed inside the developing portion and repeatedly contacts the toner.

When the image durability decreases, a white vertical stripe forms in a solidly black portion of the formed image or fogging occurs at a margin portion to degrade the image quality.

It may be considered to make the semiconductive roller have a porous structure by blending a foaming agent, etc., and thereby impart the semiconductive roller with high flexibility. However, such a porous semiconductive roller has problems in that it is shorter in durable life than a non-porous roller and must be exchanged due to occurrence of setting, etc., in a comparatively short period of time.

Patent Document 3 (Japanese Patent Application Publication No. 9-114189) discloses a semiconductive roller with a two-layer structure where a surface layer is laminated on an outer peripheral surface of a conductive elastic body layer. The surface layer has a sea-island structure constituted of a mutually incompatible mixture of acrylonitrile butadiene rubber (NBR) and styrene butadiene rubber (SBR) and contains an ion conductivity imparting agent.

Lithium perchlorate, sodium perchlorate, calcium perchlorate, and long-chain alkyl quaternary ammonium perchlorate, etc., are cited as examples of the ion conductivity imparting agent.

Forming of a semiconductive roller with a single-layer structure adopting the arrangement of the surface layer described above may be considered. In this case, an ion conductive rubber is not included and it may therefore be possible to prevent the attachment of toner while maintaining a low roller resistance value by the ion conductivity imparting agent.

However with this arrangement, the ion conductivity imparting agent readily exudes to the surface when, for example, electric field application is continued or upon exposure to high temperature, etc. There is thus a problem in that the exuded ion conductivity imparting agent becomes transferred onto the surface of the photoreceptor, etc., to cause so-called contamination and degrade the image quality of the formed image.

Patent Document 4 (Japanese Patent Application Publication No. 2002-278320) discloses a semiconductive roller with a two-layer structure where a surface layer is laminated on an outer peripheral surface of an elastic layer. The surface layer is made of a fluorine-based material and the elastic layer is made of a mixture of ethylene propylene diene rubber (EPDM), NBR, and SBR and contains conductive carbon black (carbon conductive substance).

However, if electronic conductivity is imparted using just the conductive carbon black as the conductive agent, the roller resistance value cannot be stabilized unless a laminated structure is arranged by coating the outer peripheral surface with the surface layer, etc. That is, the semiconductive roller cannot be arranged as a single-layer structure and there is thus a problem in that the productivity is decreased and the manufacturing cost is made high in correspondence to increase of manufacturing steps and materials used.

Patent Document 5 (Japanese Patent Application Publication No. 2012-163776) discloses a semiconductive roller formed by using SBR and epichlorohydrin rubber in combination as the rubber components.

It is deemed that the effects that the semiconductive roller can be made pliable to enable improvement of the toner image durability, and the amount of epichlorohydrin rubber, which is a cause of attachment of toner, can be lessened in correspondence to the combined use of SBR to make it less likely for decrease of image density due to attachment of the toner etc., to occur can be obtained when these two types of rubber components are used in combination.

BRIEF SUMMARY OF THE INVENTION

However, with the semiconductive roller that uses SBR and epichlorohydrin rubber in combination as the rubber components, there is a tendency for the compression set to be large, especially with increase of the proportion of SBR.

If when the compression set is large, the semiconductive roller is, for example, incorporated as a developing roller in an image forming apparatus and used by putting it into repeated press contact with the photoreceptor, blade, or toner, etc., setting may occur in a comparatively short period of time and preclude the securing of a predetermined nip pressure and nip width. Long-term use is thus difficult.

Also, when the image forming apparatus is stopped and left as it is for a long period of time with the roller being in press contact with the photoreceptor, blade, or toner, etc., a contact mark due to the photoreceptor, etc., tends to be left on the outer peripheral surface. The contact mark may then be applied to a formed image to obstruct the forming of a good image, especially immediately after restart of operation of the image forming apparatus.

One embodiment of the present invention provides a semiconductive roller that includes a crosslinked product containing just the three types of rubber of butadiene rubber (BR), epichlorohydrin rubber, and CR as rubber components, has a non-porous, single-layer structure, and has a compression set Cs (%) of not more than 10% as measured in accordance with the measurement method described in the Japanese Industrial Standards JIS K6262:2006 under conditions of a test temperature of 70° C., a test time of 24 hours, and a compression ratio of 25%.

With the embodiment of the present invention, a semiconductive roller, which has a non-porous, single layer structure and with which the toner charge amount is high and decrease of image density due to toner attachment, etc., is unlikely to occur, can be provided. Further, the semiconductive roller is excellent in toner image durability and low in compression set to enable use over a long period of time, and yet a contact mark is unlikely to remain on its outer peripheral surface.

DETAILED DESCRIPTION OF EMBODIMENTS

One embodiment of the present invention is a semiconductive roller that includes a crosslinked product containing just the three types of rubber of butadiene rubber (BR), epichlorohydrin rubber, and CR as rubber components. The semiconductive roller has a non-porous, single-layer structure, and has a compression set Cs (%) of not more than 10% as measured in accordance with the measurement method described in the Japanese Industrial Standards JIS K6262:2006 under conditions of a test temperature of 70° C., a test time of 24 hours, and a compression ratio of 25%.

Here, "single-layer structure" indicates that the number of layers constituted of a rubber composition is single and an oxide film, to be described below, is not counted in the number of layers.

In the embodiment of the present invention, BR, with which a crosslinked product of low compression set can be formed, is used, instead of SBR, in combination with epichlorohydrin rubber so that the compression set Cs (%) of the semiconductive roller formed to have the non-porous, single-layer structure is small and not more than 10%. This enables use over a long term and makes it unlikely for a contact mark to be left on an outer peripheral surface.

Also by using BR in combination, the amount of epichlorohydrin rubber, which is a cause of toner attachment can be lessened to make it less likely for decrease of image density due to toner attachment, etc., to occur.

Moreover by further using CR in combination with the above two types of rubber components, pliability and nip width of appropriate values can be secured in the semiconductive roller to increase the toner charge amount and improve the toner image durability at the same time.

The semiconductive roller is manufactured, for example, by blending, in the three types of rubber components, a crosslinking component that crosslinks the rubber components, etc., to prepare a rubber composition, molding the rubber composite on into a tubular shape with a non-porous, single-layer structure, and then crosslinking the rubber composition.

<Rubber Components>

As the rubber components, just the three types of rubber of BR, epichlorohydrin rubber, and CR are used in combination as described above. However with each of BR, epichlorohydrin rubber, and CR, two or more different types may be combined separately.

(BR)

Any of various polymers having a polybutadiene structure and having a crosslinking property may be used as BR. In particular, a high cis BR with a cis-1,4 bond percentage of not less than 90% by mass, which enables the forming of a crosslinked product that is pliable and yet low in compression set, is preferable.

The blending proportion of BR with respect to 100 parts by mass of the total amount of rubber components is preferably not less than 10 parts by mass and not more than 80 parts by mass.

If the blending proportion of BR is less than this range, the effect of using BR in combination to lessen the amount of the epichlorohydrin rubber, which causes toner attachment, to make it less likely for decrease of image density due to attachment of the toner, etc., to occur may not be obtained sufficiently.

Also, if the blending proportion of BR exceeds the above range, the amount of epichlorohydrin rubber decreases relatively. The semiconductive roller may thus increase in roller resistance value and decrease of toner charge amount may occur when the roller is used as a developing roller.

(Epichlorohydrin Rubber)

As examples of epichlorohydrin rubber, one type or two or more types among an epichlorohydrin homopolymer, epichlorohydrin-ethylene oxide binary copolymer (ECO), epichlorohydrin-propylene oxide binary copolymer, epichlorohydrin-allyl glycidyl ether binary copolymer, epichlorohydrin-ethylene oxide-allyl glycidyl ether ternary copolymer (GECO), epichlorohydrin-propylene oxide-allyl glycidyl ether ternary copolymer, epichlorohydrin-ethylene oxide-propylene oxide-allyl glycidyl ether quaternary copolymer, etc., can be cited.

Among these, a copolymer containing ethylene oxide and especially ECO and/or GECO is preferable as epichlohydrin rubber.

In either of these copolymers, the ethylene oxide content is preferably not less than 30 mole % and especially preferably not less than 60 mole % and preferably not more than 95 mole % and especially preferably not more than 80 mole %.

The ethylene oxide acts to decrease the roller resistance value of the semiconductive roller. However, if the ethylene oxide content is less than the above range, the function cannot be obtained sufficiently and it may not be possible to decrease the resistance value of the semiconductive roller sufficiently.

On the other hand if the ethylene oxide content exceeds too above range, crystallization of the ethylene oxide occurs, causing inhibition of segmental motion of the molecular chain so that the roller resistance value of the semiconductive roller tends to increase instead.

Also, increase of viscosity may occur when the rubber components and other components are kneaded to prepare the rubber composition that is to be the base of the semiconductive roller or when the prepared rubber composition before crosslinking is heated and melted to be molded into the tubular shape and the workability of these processes may therefore decrease. Further, the hardness of the semiconductive roller after crosslinking may increase.

In ECO, the epichlorohydrin content is the remaining amount with respect to the ethylene oxide content. That is, the epichlorohydrin content is preferably not less than 5 mole % and especially preferably not less than 20 mole % and preferably not more than 70 mole % and especially preferably not more than 40 mole %.

Also in GECO, the allyl glycidyl ether content is preferably not less than 0.5 mole % and especially preferably not less than 2 mole % and preferably not more than 10 mole % and especially preferably not more than 6 mole %.

Allyl glycidyl ether itself functions as a side chain to secure a free volume and thereby acts to suppress crystallization of ethylene oxide and decrease the roller resistance value of the semiconductive roller. However, if the allyl glycidyl ether content is less than the above range, this action cannot be provided and it may not be possible to decrease the roller resistance value of the semiconductive roller sufficiently.

On the other hand, allyl glycidyl ether functions as a cross linking point in the process of crosslinking of GECO and therefore if the allyl glycidyl ether content exceeds the above range, the crosslinking density of GECO increases and segmental motion of the molecular chain is inhibited. Consequently, the roller resistance value of the semiconductive roller tends to increase. Also, the semiconductive roller may be lowered in tensile strength, fatigue characteristics, flex resistance, etc.

In GECO, the epichlorohydrin content is the remaining amount with respect to the ethylene oxide content and the allyl glycidyl ether content. In particular, the epichlorohydrin content is preferably not less than 4.5 mole % and especially preferably not less than 15 mole % and preferably not more than 65 mole % and especially preferably not more than 40 mole %.

As GECO, in addition to the copolymer in the strict sense in which the three types of monomers described above are copolymerized, there is also known a modification product obtained by modification of epichlorohydrin-ethylene oxide copolymer (ECO) by allyl glycidyl ether, and this modification product may also be used as GECO in the present embodiment.

The blending proportion of epichlorohydrin rubber with respect to 100 parts by mass of the total amount of rubber components is preferably not less than 5 parts by mass and especially preferably not less than 10 parts by mass and preferably not more than 90 parts by mass and especially preferably not more than 80 parts by mass.

If the blending proportion of epichlorohydrin rubber is less than this range, the semiconductive roller may not be imparted with a satisfactory ion conductivity.

On the other hand, if the blending proportion of epichlorohydrin rubber exceeds the above range, toner becomes easily attached to the semiconductive roller and the image density of the formed image may decrease.

(CR)

CR is synthesized, for example, by emulsion polymerization of chloroprene and although it is classified into a sulfur-modified type and a non-sulfur-modified type according to the type of molecular weight regulator used in the polymerization process, both types of CR may be used in the present embodiment.

A sulfur-modified type CR is obtained by copolymerizing chloroprene and sulfur as a molecular weight regulator and using thiuram disulfide, etc., to plasticize and adjust the polymer thus obtained to a predetermined viscosity.

A non-sulfur-modified type CR is classified, into a mercaptan-modified type, a xanthogen-modified type, etc.

Among these, a mercaptan-modified type CR is synthesized in the same manner as the sulfur-modified type CR using, for example, an alkylmercaptan, such as n-dodecyl mercaptan, tert-dodecyl mercaptan, octyl mercaptan, as the molecular weight regulator. Also, a xanthogen-modified type CR is synthesized in the same manner as the sulfur-modified type CR using an alkyl xanthogen compound as the molecular weight regulator.

Also, CR is classified based on its crystallization rate into a slow crystallization rate type, an intermediate crystallization rate type, and a fast crystallization rate type.

In the present embodiment, any type of CR may be used and among the above, one type or two or more types of CR that is a non-sulfur-modified type of slow crystallization rate is especially preferable.

Further as CR, a copolymer rubber of chloroprene and another copolymerization component may be used.

As examples of the other copolymerization component, one type or two or more types among 2,3-dichloro-1,3-butadiene, 1-chloro-1,3-butadiene, styrene, acrylonitrile, methacrylonitrile, isoprene, butadiene, acrylic acid, acrylic acid ester, methacrylic acid, methacrylic acid ester, etc., can be cited.

Although the blending proportion of CR may be set as suited in accordance with the targeted roller resistance value of the semiconductive roller, etc., in particular, the blending proportion with respect to 100 parts by mass of the total amount of rubber components is preferably not less than 1 parts by mass and especially preferably not less than 5 parts by mass and preferably not more than 30 parts by mass.

If the blending proportion of CR is less than this range, the above-described effects of appropriately securing the pliability and nip width of the semiconductive roller while increasing the toner charge amount and improving the toner image durability may not be obtained sufficiently.

Also if the blending proportion of CR exceeds the above range, the amount of epichlorohydrin rubber decreases relatively and it may not be possible to impart the semiconductive roller with a satisfactory ion conductivity.

<Crosslinking Component>

A crosslinking agent, an accelerator, etc., can be cited as a crosslinking component that crosslinks the three types of rubber components.

As examples of the crosslinking agent, one type or two or more types among a sulfur-based crosslinking agent, thiourea-based crosslinking agents triazine derivative-based crosslinking agent, peroxide-based crosslinking agent, and any of various monomers, etc., can be cited. Among these, a sulfur-based crosslinking agent is preferable.

As examples of the sulfur-based crosslinking agent, powdered sulfur, an organic sulfur-containing compound, etc., can be cited. Among these, as example of an organic sulfur-containing compound, tetramethylthiuram disulfide, N, N-dithiobismorpholine, can be cited. Sulfur such as powdered sulfur is especially preferably.

The blending proportion of sulfur with respect to 100 parts by mass of the total amount of rubber components is preferably not less than 0.2 parts by mass and especially preferably not less than 1 parts by mass and preferably not more than 5 parts by mass and especially preferably not more than 3 parts by mass.

If the blending proportion is less than this range, the crosslinking rate of the rubber composition as a whole is slow so that the time required for crosslinking becomes long and the semiconductive roller may be lowered in productivity. If the range is exceeded, the compression set of the semiconductive roller after crosslinking is large or excess sulfur may bloom out on the outer peripheral surface of the semiconductive roller.

As examples of the accelerator, one type or two or more types among an inorganic accelerator such as slaked lime, magnesia (MgO), and litharge (PbO), an organic accelerator, etc., can be cited.

As examples of the organic accelerator, one type or two or more types among a guanidine-based accelerator such as 1,3-di-o-tolylguanidine, 1,3-diphenylguanidine, 1-o-tolylbiguanide, and di-o-tolyl guanidine salt of dicatechol borate; a thiazole-based accelerator such as 2-mercaptobenzothiazole and di-2-benzothiazyl disulfide; a sulfenamide-based accelerator such as N-cyclohexyl-2-benzothiazyl and sulfenamide; a thiuram-based accelerator such as tetramethylthiuram monosulfide, tetramethylthiuram disulfide, tetraethylthiuram disulfide, and dipentamethylenethiuram tetrasulfide; a thioarea-based accelerator such as ethylene thiourea, tetramethylthiourea, and trimethylthiourea; can be cited.

As the accelerator, one type or two or more types of the optimal accelerator may be selected from among the various accelerators and used in accordance with the type of crosslinking agent to be combined with. In particular, an accelerator differs in mechanism of crosslinking acceleration according to type and it is thus preferable to use two or more types in combination. Although the blending proportion of each individual accelerator to be used in combination may be set as suited, the blending proportion with respect to 100 parts by mass of the total amount of rubber components is preferably not less than 0.1 parts by mass and not more than 2 parts by mass.

A supplement accelerator may be blended further as a crosslinking component.

As examples of the supplement accelerator, one type or two or more types among a metal compound such as zinc white (zinc oxide); a fatty acid such as stearic acid, oleic acid, and cottonseed fatty acid; and other conventionally known supplement accelerators can be cited.

The blending proportion of the supplement accelerator may be set as suited in accordance with the types and combination of the rubber components, the types and combination of the crosslinking agent, and the accelerator, etc.

<Others>

Various additives may further be added as necessary to the rubber composition. An acid accepting agent, plasticizer, auxiliary processing agent, antidegradant, filler, anti-scorch agent, ultraviolet absorber, lubricant, pigment, anti-static agent, flame retardant, neutralizer, nucleating agent, co-crosslinking agent, etc., can be cited as examples of additives.

Among the above, the acid accepting agent functions to prevent a chlorine-based gas, generated from epichlorohydrin rubber and CR during one crosslinking of the rubber components, from remaining inside the semiconductive roller and thereby causing inhibition of crosslinking, contamination of she photoreceptor, etc.

As the acid accepting agent, any of various substances that act as an acid acceptor may be used. Among these, a hydrotalcite or magsarat, which is excellent in dispersibility, is preferable and a hydrotalcite is especially preferable.

Also, a high acid accepting effect can be obtained by using the hydrotalcite, etc., in combination with magnesium oxide or potassium oxide to prevent the contamination of the photoreceptor more reliably.

The blending proportion of the acid accepting agent with respect, to 100 parts by mass of the total amount of rubber components is preferably not less than 0.2 parts by mass and especially preferably not less than 0.5 parts by mass and preferably not more than 5 parts by mass and especially preferably not more than 3 parts by mass.

If the blending proportion is less than this range, the effect of blending in the acid accepting agent may not be obtained sufficiently. When the range is exceeded, the hardness of the semiconductive roller after crosslinking may increase.

Any of various plasticizers such as dibutyl phthalate (DBF), dioctyl phthalate (DOP), and tricresyl phosphate and any of various waxes such as a polar wax can be cited as examples of the plasticizer. Stearic acid and other fatty acids can be cited as the auxiliary processing agent.

The blending proportion of the plasticizer and/or the auxiliary processing agent with respect to 100 parts by mass of the total amount of rubber components is preferably not more than 5 parts by mass. This is in order to prevent the contamination of the photoreceptor, for example, during installation onto the image forming apparatus and during operation. In terms of this object, use of a polar wax among the plasticizers is especially preferable.

Any of various age resistors, antioxidants, etc, can be cited as examples of the antidegradant.

Among these, the antioxidant acts to reduce the environmental dependence of the roller resistance value of the send conductive roller and suppress increase of the roller resistance value while electricity is supplied continuously. Nickel diethyldithiocarbamate (Nocrac (registered trademark) NEC-P manufactured by Ouchi Shinko Chemical Industrial Co., Ltd.), nickel dibutyldithiocarbamate (Nocrac NBC manufactured by Ouchi Shinko Chemical Industrial Co., Ltd.), etc., can be cited as examples of the antioxidant.

As examples of the filler, one type or two or more types among zinc oxide, silica, carbon, carbon black, clay, talc, calcium carbonate, magnesium carbonate, aluminum hydroxide, etc. can be cited.

The mechanical strength, etc., of the semiconductive roller can be improved by blending in the filler.

The blending proportion of the filler with respect to 100 parts by mass of the total amount of rubber components is preferably not less than 5 parts by mass and preferably not more than 25 parts by mass and especially preferably not more than 20 parts by mass.

Also, conductive carbon black may be blended as the filler to impart the semiconductive roller with electronic conductivity.

HAF is preferable as the conductive carbon black. HAF can be dispersed uniformly in the rubber composition and therefore enables an electronic conductivity that is as uniform as possible to be imparted to the semiconductive roller.

The blending proportion of the conductive carbon black with respect to 100 parts by mass of the total amount of rubber components is preferably not less than 1 parts by mass and not more than 3 parts by mass.

As examples of the anti-scorch agent, one type or two or more types among N-cyclohexylthiophthalimide, phthalic anhydride, N-nitrosodiphenylamine, 2,4-diphenyl-4-methyl-1-pentene, etc., can be cited. N-cyclohexylthiophthalimide is especially preferable.

The blending proportion of the anti-scorch agent with respect to 100 parts by mass of the total amount of rubber components is preferably not less than 0.1 parts by mass and not more than 5 parts by mass and especially preferably not more than 1 part by mass.

The co-crosslinking agent refers to a component that provides actions of crosslinking with itself and also undergoing crosslinking reactions with the rubber components to polymerize the entirety.

As examples of the co-crosslinking agent, one type or two or more types among an ethylenic unsaturated monomer, represented by a methacrylic acid ester or a metal salt of methacrylic acid or acrylic acid, etc., a polyfunctional polymer that uses functional groups of 1,2-polybutadiene, a dioxime, etc., can be cited.

Among the above, one type or two or more types among
(a) a monocarboxylic acid such as acrylic acid, methacrylic acid and crotonic acid,
(b) a dicarboxylic acid such as maleic acid, fumaric acid, and itaconic acid,
(c) an ester or anhydride of an unsaturated carboxylic acid among (a) and (b),
(d) a metal salt of (a) to (c),
(e) an aliphatic conjugate diene such as 1,3-butadiene, isoprene, and 2-chloro-1,3-butadiene,
(f) an aromatic vinyl compound such as styrene, α-methylstyrene, vinyltoluene, ethylvinylbenzene, and divinylbenzene.
(g) a vinyl compound having a heterocycle such as triallyl isocyanurate, triallyl cyanurate, and vinylpyridine, and
(h) other compounds, including cyanated vinyl compounds such as (meth)acrylonitrile, and α-chloroacrylonitrile, and acrolein, formyl sterol, vinyl methyl ketone, vinyl ethyl ketone, and vinyl butyl ketone, etc.
can be cited as examples of the ethylenic unsaturated monomer.

As the (c) ester of unsaturated carboxylic acid, an ester of a monocarboxylic acid is preferable.

As examples of the ester of monocarboxylic acid, one type or two or more types among an alkyl ester of (meth)acrylic acid such as methyl (meth) acrylate, ethyl (meth)acrylate, n-propyl (meth)acrylate, i-propyl (meth)acrylate, n-butyl (meth)acrylate, i-butyl (meth)acrylate, n-pentyl (meth)acrylate, i-pentyl (meth) acrylate, n-hexyl (meth)acrylate, cyclohexyl (meth)acrylate, 2-ethylhexyl (meth)acrylate, octyl (meth)acrylate, i-nonyl (meth)acrylate, tert-butylcyclohexyl (meth)acrylate, decyl (meth)acrylate, dodecyl (meth)acrylate, hydroxymethyl (meth)acrylate, and hydroxyethyl (meth)acrylate;

an aminoalkyl ester of (meth)acrylic acid such as aminoethyl (meth)acrylate, dimethylaminoethyl (meth)acrylate, and butylaminoethyl (meth)acrylate;

a (meth)acrylate having an aromatic ring such as benzyl (meth)acrylate, benzoyl (meth)acrylate, and aryl (meth) acrylate;

a (meth)acrylate having an epoxy group such as glycidyl (meth)acrylate, methaglycidyl (meth)acrylate, and epoxycyclohexyl (meth)acrylate;

a (meth)acrylate having any of various functional groups such as N-methylol (meth)acrylamide, γ-(meth)acryloxypropyltrimethoxysilane, and tetrahydrofurfuryl methacrylate;

a polyfunctional (meth)acrylate such as ethylene glycol di(meth)acrylate, trimethylolpropane tri(meth)acrylate, ethylene dimethacrylate (EDMA), polyethylene glycol dimethacrylate, and isobutylene ethylene dimethacrylate; can be cited as examples.

A rubber composition containing the respective components described above may be prepared in the same manner as is done conventionally. First, the rubber components are blended at the predetermined proportions and masticated and then the various additives besides the crosslinking component are added and kneading is performed. Lastly, the crosslinking component is added and kneading is performed to obtain the rubber composition. For example, a kneader, a Banbury mixer, extruder, etc., may be used to perform kneading.

<<Semiconductive Roller>>

Figure 1:
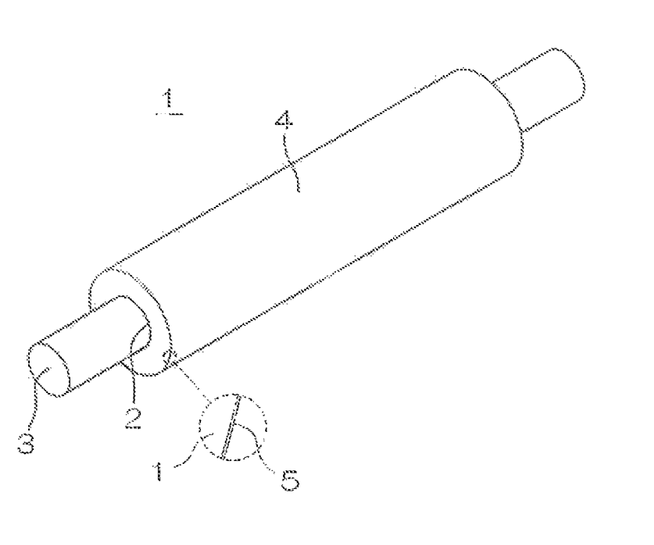
FIG. 1 is a perspective view of a semiconductive roller according to one embodiment of the present invention.

FIG. 1 is a perspective view of a semiconductive roller according to one embodiment of the present invention.

With reference to FIG. 1, the semiconductive roller 1 of the present example is formed to a tubular shape with a non-porous, single-layer structure from the rubber composition and has a shaft 3 inserted and fixed in a central through hole 2.

The shaft 3 is formed integrally from a metal such as aluminum, aluminum alloy, and stainless steel.

The shaft 3 is electrically bonded and mechanically fixed to the semiconductive roller 1, for example, via an adhesive with a conductive property. Or, the shaft 3 has an outer diameter greater than the inner diameter of the through hole 2 and is press-fitted into the through hole 2 to be electrically bonded and mechanically fixed to the semiconductive roller 1. The shaft 3 and the semiconductive roller 1 are thereby made to rotate integrally.

An oxide film 5 may be provided on an outer peripheral surface 4 of the semiconductive roller 1 as shown in enlarged manner in the FIGURE.

When the oxide film 5 is formed, the oxide film 5 functions as a dielectric layer to reduce the dielectric loss tangent of the semiconductive roller 1. Also, in the case of use as a developing roller, the oxide film 5 serves as a low friction layer to further suppress toner attachment.

Moreover, the oxide film 5 can be formed simply by irradiating ultraviolet rays in an oxidizing atmosphere, etc., so that lowering of productivity and increase of manufacturing cost of the semiconductive roller 1 can be suppressed as much as possible. However, the oxide film 5 does not have to be formed.

To manufacture the semiconductive roller 1, first the rubber composition that has been prepared in advance is extrusion-molded to the tubular shape using an extrusion molder, then cut to a predetermined length, and thereafter crosslinked by being pressurized and heated in a vulcanizer.

The crosslinked tubular body is then heated using an oven, etc., to perform secondary crosslinking and then after cooling, polished to a predetermined outer diameter.

The shaft 3 may be fixed by inserting into the through hole 2 at any point from after the cutting of the tubular body to after the polishing.

However, it is preferable to perform the secondary crosslinking and the polishing after first inserting the shaft 3 into the through hole 2 after the cutting. Warping and deformation of the tubular body (semiconductive roller 1) due to expansion/shrinkage during the secondary crosslinking can thereby be prevented. Also by performing polishing while rotating the roller around the shaft 3 as the center, the polishing can be improved in workability and deflection of the outer peripheral surface 4 can be suppressed.

As mentioned above, the shaft 3 of the outer diameter greater than the inner diameter of the through hole 2 may be press-fitted into the through hole 2 or insertion into the through hole 2 of the tubular body before secondary crosslinking may be performed via a thermosetting adhesive with a conductive property.

In the latter case, the thermosetting adhesive hardens at the same time as the tubular body undergoes secondary crosslinking due to heating in the oven so that the shaft 3 becomes electrically bonded and mechanically fixed to the tubular body (semiconductive roller 1).

Also in the former case, the electrical bonding and the mechanical fixing are completed at the same time as the press fitting.

As described above, the oxide film 5 is preferably formed by irradiating ultraviolet rays onto the outer peripheral surface 4 of the semiconductive roller 1 because it can then be formed simply and efficiently. That is, the rubber composition, constituting the outer peripheral surface 4 of the semiconductive roller 1, itself is irradiated with ultraviolet rays of a predetermined wavelength for a predetermined time to form the oxide film 5.

Moreover, the oxide trim 5 is formed by the rubber composition, constituting the outer peripheral surface 4 of the semiconductive roller 1, being oxidized in itself described above and therefore does not cause problems such as a conventional coating layer formed by coating on a coating agent and is excellent in uniformity of thickness, surface shape, etc.

In consideration of oxidizing the rubber composition efficiently to form the oxide film 5 with the excellent functions described above, the wavelength of the irradiated ultraviolet rays is preferably not less than 100 nm and preferably not more than 400 nm and especially preferably not more than 300 nm. Also, the irradiation time is preferably not less than 30 seconds and especially preferably not less than 1 minute and preferably not more than 30 minutes and especially preferably not more than 15 minutes.

However, the oxide film 5 may be formed by another method or may be omitted depending on the case.

The semiconductive roller 1 is required to have a compression set Cs (%) of not more than 10% as measured in accordance with the measurement method described in the Japanese Industrial Standards JIS K6262:2006, "Rubber, vulcanized or thermoplastic—Determination of compression set at ambient, elevated or low temperatures," under conditions of a test temperature of 70° C., a test time of 24 hours, and a compression ratio of 25%.

The compression set Cs (%) shall be expresssed by a value measured by using a test piece prepared, using the same rubber composition as that for forming the semiconductive roller 1, in accordance with a preparation method described in the abovementioned standards.

As mentioned above, if the compression set Cs (%) exceeds 10%, the semiconductive roller 1 is incorporated as a developing roller in an image forming apparatus and used by putting it into repeated press contact with the photoreceptor, blade, or toner, etc., setting may occur in a comparatively short period of time and preclude the securing of a predetermined nip pressure and nip width. Long-term use is consequently made difficult.

Also, when the image forming apparatus is stopped and left as it is for a long period of time with the roller being in press contact with the photoreceptor, blade, or toner, etc., a contact mark due to the photoreceptor, etc., tends to be left on the outer peripheral surface. The contact mark may then be applied to a formed image to obstruct the forming of a good image, especially immediately after restart of operation of the image forming apparatus.

In contrast, by restricting the compression set Cs (%) to not more than 10%, the semiconductive roller 1 can be provided with which the compression set is small, use can be made over a long period of time, and a contact mark is unlikely to be left on the outer peripheral surface.

In consideration of further improving these effects, the compression set Cs (%) is preferably not more than 9% and especially preferably not more than 8% even within the abovementioned range. A lower limit of the compression set Cs (%) is not defined in particular. The effects described above can be improved further when the compression set is lower.

A fundamental point of making the compression set Cs (%) of the semiconductive roller 1 be within the abovementioned range is to replace the conventionally used SBR by BR as described above. It is further possible to finely adjust the compression set Cs (%) within the abovementioned range by selecting the grades of BR, epichlorohydrin rubber, and CR, adjusting the types, combination, and blending proportions of the crosslinking component, filler, plasticizer, and/or auxiliary processing agent, and adjusting the molding and crosslinking conditions.

The semiconductive roller 1 can favorably be used, for example, as a developing roller that is incorporated in a laser printer or other image forming apparatus using an electrophotographic method and arranged to develop an electrostatic latent image, formed on a surface of a photoreceptor, into a toner image by means of a charged toner.

For example, in the case of use as a developing roller, the thickness of the semiconductive roller 1 is preferably not less than 0.5 mm, more preferably not less than 1 mm, and especially preferably not less than 2 mm and preferably not more than 10 mm, more preferably not more than 7 mm, and especially preferably not more than 5 mm in order to secure an appropriate nip width while realizing compact size and light weight.

The semiconductive roller according to one embodiment of the present invention can favorably be used as the developing roller, etc., in an image forming apparatus using an electrophotographic method such as a laser printer, electrostatic copier, plain-paper facsimile apparatus, or a multi-function printer combining the above. Besides this, the roller may be used as a charging roller, transfer roller, cleaning roller, etc., in the image forming apparatus.

EXAMPLES

Example 1

(Preparation of Rubber Composition)

As rubber components, 80 parts by mass of BR [JSR BR01 manufactured by JSR Corporation; cis-1,4 bond content: 95% by mass, Mooney viscosity $ML_{1+4}$ (100° C.); 45], 10 parts by mass of GECO [Epion (registered trademark)—301 manufactured by Daiso Co., Ltd.; EO/EP/AGE=73/23/4 (molar ratio)], and 10 parts by mass of CE [Shoprene (registered trademark) WRT manufactured by Showa Denko K. K.] were blended.

While masticating the total of 100 parts by mass of the rubber components using a Banbury mixer, the respective components besides the crosslinking component shown in Table 1 below were added and kneaded in, and thereafter the crosslinking component was added finally and further kneading was performed to prepare a rubber composition.

Table 1

TABLE 1

| Component | Parts by mass |
|---|---|
| Sulfur-based crosslinking agent | 1.05 |
| Thiuram-based accelerator | 0.50 |
| Thiazole-based accelerator | 1.50 |
| Thiourea-based accelerator | 0.33 |
| Guanidine-based accelerator | 0.28 |
| Supplement accelerator | 5.0 |
| Filler I | 10.0 |
| Filler II | 0.2 |
| Acid accepting agent | 3.0 |

The respective components in Table 1 are as follows.

Sulfur-based crosslinking agent: Sulfur with 5% oil [manufactured by Tsurumi Chemical Industry Co., Ltd.]

Thiuram-based accelerator: Tetramethylthiuram monosulfide [Sanceler (registered trademark) TS manufactured by Sanshin Chemical Industry Co., Ltd.]

Thiazole-based accelerator: Di-2-benzothiazyldisulfide [product of the trade name, Sunsine MBTS, manufactured by Shandong Shanaran Chemical Co., Ltd.]

Thiourea-based accelerator: Ethylene thiourea [2-mercaptoimidazoline, Accel (registered trademark) 22-S manufactured by Kawaguchi Chemical Industry Co., Ltd.]

Guanidine-based accelerator: 1,3-di-o-tolylguanidine [Sanceler DT manufactured by Sanshin Chemical Industry Co., Ltd.]

Supplement accelerator: Two types of zinc oxide [manufactured by Mitsui Mining & Smelting Co., Ltd.]

Filler I: Carbon black FT [Asahi #15 manufactured by Asahi Carbon Co., Ltd.]

Filler II: Conductive carbon black [Denka Black (registered trademark) granular manufactured by Denki Kagaku Kogyo Kabushiki Kaisha]

Acid accepting agent: Hydrotalcite [DHT-4A (registered trademark)—2 manufactured by Kyowa Chemical Industry Co., Ltd.]

The parts by mass in the table are parts by mass with respect to the 100 parts by mass of the total amount of the rubber components.

(Manufacture of Semiconductive Roller)

After supplying the prepared rubber composition to an extrusion molder and performing extrusion-molding to a tubular shape with an outer diameter of 20 mmφ and an inner diameter of 7.0 mmφ, the tubular body was fitted onto a provisional shaft for crosslinking and crosslinked at 160° C.×1 hour in a vulcanizer.

The crosslinked tubular body was then refitted onto a shaft having an outer diameter of 7.5 mmφ and having a thermosetting adhesive with conductive property coated on its outer peripheral surface, and after adhering to the shaft by heating to 160° C. in an oven, both ends of the tubular body were out. The outer peripheral surface of the tubular body was then traverse-polished using a cylindrical polisher and thereafter mirror polishing was performed as a finishing process to finish to an outer diameter of 16.00 mm (tolerance: 0.05) and thereby form a semiconductive roller integrated to the shaft.

After then rinsing the outer peripheral surface of the polished semiconductive roller with water, the roller was set in an ultraviolet ray irradiation apparatus [PL21-200 manufactured by Sen Lights Co., Ltd.] with the distance from the UV lamp to the outer peripheral surface being set to 5 cm. Ultraviolet rays of 184.9 nm and 253.7 nm wavelengths were irradiated for 5 minutes each while rotating the roller by 90° each around the shaft as the center to form an oxide film on the outer peripheral surface and thereby complete the semiconductive roller.

Example 2

Besides setting the BR blending amount to 70 parts by mass, the GECO blending amount to 20 parts by mass, and the CR blending amount to 10 parts by mass, a rubber composition was prepared and a semiconductive roller was manufactured in the same manner as in Example 1.

Example 3

Besides setting the BR blending amount to 20 parts by mass, the GECO blending amount to 50 parts by mass, the CR blending amount to 30 parts by mass, and setting, with respect to 100 parts by mass of the three types of rubber components, the sulfur-based crosslinking agent blending amount to 0.50 parts by mass, the thiazole-based accelerator blending amount to 0.50 parts by mass, and the filler I blending amount to 5.0 parts by mass, a rubber composition was prepared and a semiconductive roller was manufactured in the same manner as in Example 1.

Example 4

Besides setting the BR blending amount to 45 parts by mass, the GECO blending amount to 35 parts by mass, and the CR blending amount to 20 parts by mass, a rubber composition was prepared and a semiconductive roller was manufactured in the same manner as in Example 1.

Example 5

Besides setting the BR blending amount to 55 parts by mass, the GECO blending amount to parts by 35 mass, and the CR blending amount to 10 parts by mass, a rubber composition was prepared and a semiconductive roller was manufactured in the same manner as in Example 1.

Example 6

Besides setting the BR blending amount to 10 parts by mass, the GECO blending amount to 80 parts by mass, and the CR blending amount to 10 parts by mass, a rubber composition was prepared and a semiconductive roller was manufactured in the same manner as in Example 1.

Comparative Example 1

Beside blending 70 parts by mass of SBR [JSR1502 manufactured by JSR Corporation] in place of BR, a rubber composition was prepared and a semiconductive roller was manufactured in the same manner as in Example 2.

Comparative Example 2

Besides not blending in CR and setting the GECO blending amount to 30 parts by mass, a rubber composition was prepared and a semiconductive roller was manufactured in the same manner as in Example 2.

<Compression Set Measurements>

The rubber compositions prepared in the respective Examples and Comparative Examples were used to prepare large test pieces defined in JIS K6262:2006 by press molding under conditions of 160° C.×60 minutes. The large test pieces were used to perform compression tests under conditions of a test temperature of 70° C., a test time of 24 hours, and a compression ratio of 25%. The compression set CS (%) was determined from the thickness $t_0$ of each test piece before compression, the thickness $t_1$ of a spacer used during compression, and the thickness $t_2$ of the test piece 30 minuses after releasing the compression and by using the following formula (1):

[Numerical Formula 1]

Numerical Formula 1

$$CS = \frac{t_0 - t_2}{t_0 - t_1} \quad (1)$$

<Actual Apparatus Test>

A developing roller installed in a new cartridge (an integral arrangement of a toner container containing toner, a photoreceptor, and the developing roller) for a commercially sold laser printer was exchanged with each of the semiconductive rollers prepared in the respective Examples and Comparative Examples and the following test was performed. The laser-printer uses a nonmagnetic, single-component toner of positively-charged pulverized type, the printing speed is 26 pages per minute (26 ppm), and the set number of pages on which an image of 5% density can be formed continuously (printer life) is 2600 pages [A4 size, published value in Japanese Industrial Standards JIS X6932: 2008]. Besides the conditions indicated above, the test environment was set to an ordinary temperature, ordinary humidity environment of 23° C. temperature and 55% relative humidity.

(Evaluation of Contact Mark)

Each of the cartridges respectively incorporating the semiconductive rollers manufactured in the respective Examples and Comparative Examples was set still for 24 hours in an oven set to a temperature of 50° C. and then installed in the laser printer. A half-tone image of 50% density was then output and whether or not a contact mark due to contact with the photoreceptor or the blade was formed in the formed image was judged visually and evaluated according to the following standards.

○: No contact marks are seen at all. Satisfactory.
Δ: Although a contact mark is seen thinly, the quality is of a practical level,
x: A contact mark is seen clearly. Poor.

(Image Durability Evaluation)

Each of the cartridges respectively incorporating the semiconductive rollers manufactured in the respective Examples and Comparative Examples was installed in the laser printer. An operation of performing continuous image forming of an image of 1% density and checking for occurrence or non-occurrence of fogging at every 500 pages was repeated until a white vertical stripe appeared in a solidly black portion or up to 2600 pages, which is the printer life. The toner image durability was evaluated according to the following standards.

○: A white vertical stripe did not form up to 2600 pages. Satisfactory.
x: A white vertical stripe formed before 2600 pages were printed. Poor.

The results of the above are shown in Table 2 and Table 3.

[Table 2]

TABLE 2

|  |  | Comparative Example 1 | Example 1 | Example 2 | Example 3 |
|---|---|---|---|---|---|
| Parts by mass | BR | — | 80 | 70 | 20 |
|  | SBR | 70 | — | — | — |
|  | GECO | 20 | 10 | 10 | 50 |
|  | CR | 10 | 10 | 10 | 30 |
| Evaluation | Compression set CS (%) | 13.5 | 6.5 | 6.8 | 7.1 |
|  | Contact mark | x | ○ | ○ | ○ |
|  | Toner image durability | x | ○ | ○ | ○ |

[Table 3]

TABLE 3

|  |  | Example 4 | Example 5 | Example 6 | Comparative Example 2 |
|---|---|---|---|---|---|
| Parts by mass | BR | 45 | 55 | 10 | 70 |
|  | SBR | — | — | — | — |
|  | GECO | 35 | 35 | 80 | 30 |
|  | CR | 20 | 10 | 10 | — |
| Evaluation | Compression set CS (%) | 9.0 | 7.8 | 7.3 | 7.5 |
|  | Contact mark | Δ | ○ | ○ | ○ |
|  | Toner image durability | ○ | ○ | ○ | x |

From the results of Examples 1 to 6 and Comparative Example 1 in Tables 2 and 3, it was found that by using BF in place of the conventional SBR in combination with epichlorohydrin rubber, a semiconductive roller can be presided with which the compression set is low to enable use over a long period of time and yet a contact mark is unlikely to remain on its outer peripheral surface. However, from the results of Examples 1 to 6 and Comparative Example 2, it was found that CR must further be used in combination with the two types of rubber components to secure toner image durability.

Also from the results of Examples 1 to 6, it was found that in the system combining the three types of rubber components, it is preferable to set the BR blending amount with respect to 100 parts by mass of the total amount of rubber components to not less than 10 parts by mass and not more than 80 parts by mass.

With Example 4, the cause as to why the compression set is slightly large and a Δ result is obtained for the contact mark is considered to be the balance of the blend, in other words, considered, to be due to the compatibility of the three types of rubber components being slightly low. From the results of the other examples, it was found that with the present invention, the formation of a contact mark can be prevented reliably by detecting such problems using the compression set as an index and finely adjusting the blend, etc.

The invention claimed is:

1. A semiconductive roller comprising a crosslinked product containing just the three types of rubber of butadiene rubber, epichlorohydrin rubber, and chloroprene rubber as rubber components,
   having a non-porous, single-layer structure, and
   having a compression set Cs (%) of not more than 10% as measured in accordance with the measurement method described in the Japanese Industrial Standards JIS K6262:2006 under conditions of a test temperature of 70° C., a test time of 24 hours, and a compression ratio of 25%, wherein
   a blending proportion of the butadiene rubber with respect to 100 parts by mass of the total amount of the rubber components is not less than 10 parts by mass and not more than 80 parts by mass,
   a blending proportion of the epichlorohydrin rubber with respect to 100 parts by mass of the total amount of the rubber components is not less than 10 parts by mass and not more than 80 parts by mass, and
   a blending proportion of the chloroprene rubber with respect to 100 parts by mass of the total amount of the rubber components is not less than 5 parts by mass and not more than 30 parts by mass.

2. The semiconductive roller according to claim 1, wherein the butadiene rubber includes a high cis-butadiene rubber with a cis-1,4 bond percentage of not less than 90% by mass.

3. The semiconductive roller according to claim 1, wherein the epichlorohydrin rubber includes at least one of either of ECO and GECO, and
   the ethylene oxide content of the ECO and the GECO is not less than 30 mole % and not more than 95 mole %.

4. The semiconductive roller according to claim 2, wherein the epichlorohydrin rubber includes at least one of either of ECO and GECO, and
   the ethylene oxide content of the ECO and the GECO is not less than 30 mole % and not more than 95 mole %.

5. The semiconductive roller according to claim 1, wherein the compression set Cs (%) is not more than 8%.

6. The semiconductive roller according to claim 1, comprising an outer peripheral surface on which an oxide film is formed.

7. The semiconductive roller according to claim 1 that is used as a developing roller incorporated in an image forming apparatus using an electrophotographic method and arranged to develop an electrostatic latent image, formed on a surface of a photoreceptor, into a toner image by means of a charged toner.

* * * * *